(12) United States Patent
Carniato

(10) Patent No.: US 9,528,827 B2
(45) Date of Patent: Dec. 27, 2016

(54) DEVICE FOR MEASUREMENT OF DEVIATION FROM A REFERENCE AXIS

(71) Applicant: Arking Pty Ltd, Brunswick East (AU)

(72) Inventor: Valerio Carniato, Brunswick East (AU)

(73) Assignee: Arking Pty Ltd, Brunswick East (AU)

( * ) Notice: Subject to any disclaimer, the term of this patent is extended or adjusted under 35 U.S.C. 154(b) by 147 days.

(21) Appl. No.: 14/614,212

(22) Filed: Feb. 4, 2015

(65) Prior Publication Data

US 2016/0076886 A1 Mar. 17, 2016

(30) Foreign Application Priority Data

Sep. 11, 2014 (AU) ................................. 2014903629

(51) Int. Cl.
*G01C 9/26* (2006.01)

(52) U.S. Cl.
CPC ....................................... *G01C 9/26* (2013.01)

(58) Field of Classification Search
CPC ........................................................ G01C 9/26
USPC .................................... 33/301, 354, 365, 379
See application file for complete search history.

(56) References Cited

U.S. PATENT DOCUMENTS

| | | | | |
|---|---|---|---|---|
| 2,921,380 A * | 1/1960 | Savet | ........................ | G01C 9/08 33/303 |
| 3,533,167 A * | 10/1970 | Thompson | ................ | G01C 9/12 33/351 |
| 5,878,502 A * | 3/1999 | Donahue, Jr. | ............ | G01C 9/26 33/343 |
| 6,477,781 B1 * | 11/2002 | Blatt | ........................ | G01C 9/26 33/381 |
| 2010/0050449 A1 * | 3/2010 | Ilton | ........................ | G01C 9/26 33/301 |
| 2013/0167387 A1 * | 7/2013 | Lueck | ....................... | G01C 9/26 33/374 |
| 2013/0239422 A1 * | 9/2013 | Kang | ...................... | G01C 17/16 33/354 |
| 2014/0373371 A1 * | 12/2014 | Silberberg | ............... | G01C 9/28 33/381 |
| 2015/0330781 A1 * | 11/2015 | Harris | .................... | A47G 21/04 33/301 |
| 2015/0377620 A1 * | 12/2015 | Heerschap | ............. | G01C 17/16 33/301 |

* cited by examiner

*Primary Examiner* — G. Bradley Bennett
(74) *Attorney, Agent, or Firm* — Seed IP Law Group LLP

(57) ABSTRACT

A device for measurement of deviation of a surface being assessed from a reference axis includes a device body having a means for determining a pre-selected reference axis, the means including a reference surface of the device body which can be aligned with the reference axis, and an indicator on the device body for indicating alignment of the reference surface with the reference axis. A deviation meter connected to the device body is configured to measure the extent of deviation from the reference axis, wherein the deviation meter includes a reference point and a gauging means indicating the measure of the deviation of the reference point from the reference surface. An adjuster is configured to adjust the relative position of the reference point of the deviation meter to the reference surface of the device.

20 Claims, 11 Drawing Sheets

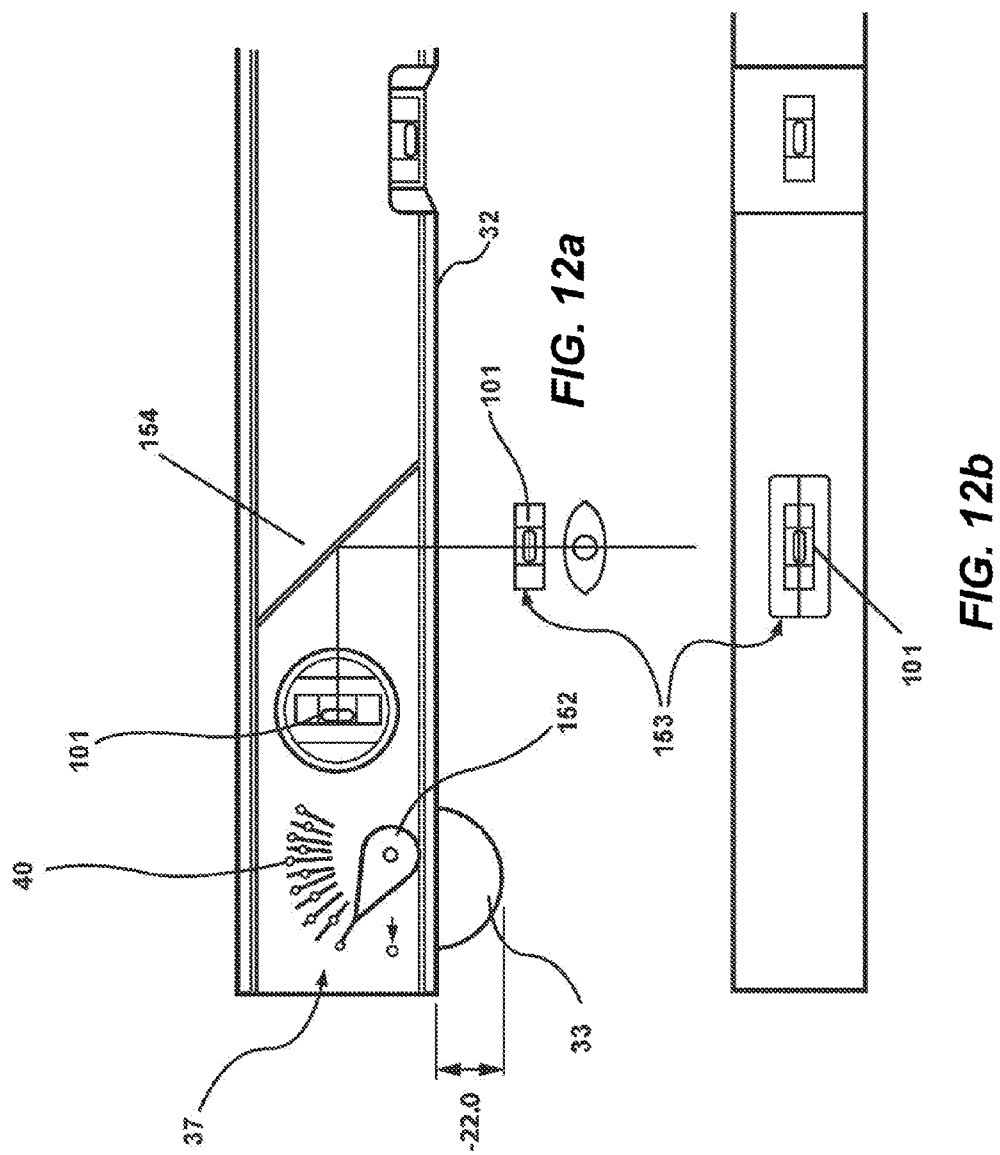

DEVICE FOR MEASUREMENT OF DEVIATION FROM A REFERENCE AXIS

BACKGROUND

Technical Field

The present disclosure relates to a device for measurement of deviation from a reference axis and in particular to a device for measurement of deviation from a vertical or horizontal reference axis.

The disclosure has been developed primarily for use with a levelling device such as a spirit level for measurement of deviation from a reference axis and will be described hereinafter with reference to this application. However, it will be appreciated that the disclosure is not limited to this particular field of use.

Description of the Related Art

It is common in commercial and domestic buildings for owners to upgrade or alter various spaces and structures therein such as rooms, doors, windows and various fixtures, to address faults caused by movement of sub-assemblies or temperature or moisture, or even simply to provide a change of aesthetics or style of a room.

Upgrades such as door replacements, window replacements, wall replacements, fixture replacements such as shower screens and the like, require some building and construction skills because more often than not when replacing a door or shower screen for example, walls adjacent to or support for a replacement fixture may have moved.

In such circumstances, it is not simply a matter of removing one element and replacing with another, because if a wall is out of 'plumb', replacing with an identical fixture may leave an unsightly misalignment between the replacement fixture and existing wall. It is not unusual for example, for tiled walls in a bathroom shower area to be installed out of 'plumb', hence when installing a door or glass plate or panel and the like to substantially align with an existing tiled wall, it is convenient to know the extent of deviation from 'plumb' so that a door or glass plate can be measured and tailored to mate with the tiled wall.

One method traditionally used by builders to determine extent of deviation from 'plumb' uses a 'spirit level' having a bubble gauge comprising a transparent vial containing a colored liquid such that an air bubble is created. In use:

(a) the spirit level is placed on a surface of vertical or horizontal structure, and inclination from plump or horizontal position is indicated by position of the air bubble relative to a central position on the transparent vial;

(b) material such as 'shim' of known dimension is wedged between the structure and the spirit level until the bubble is located centrally of the transparent vial; and (c) the extent of deviation determined by the total thickness of shim required to obtain plumb or horizontal position.

The traditional approach to determining a measurement of deviation from plumb or horizontal is unwieldy and time consuming because multiple 'shims' may be required before level indication is achieved by centering the air bubble, and manual tilting of the spirit level is required for insertion of the shim(s), notwithstanding that depending on the insertion technique, the spirit level alignment may be compromised leading to incorrect readings.

In some instances, surface levels may vary over a substantial distance hence such an approach often needs to be repeated along a length of structure. Even further, traditional techniques for measuring deviation can be very clumsy and impractical particularly when used in confined spaces such as bathrooms.

The present disclosure seeks to provide a device for measurement of deviation from a reference axis, which will overcome or substantially ameliorate at least one or more of the deficiencies of the prior art, or to at least provide an alternative.

It is to be understood that, if any prior art information is referred to herein, such reference does not constitute an admission that the information forms part of the common general knowledge in the art, in Australia or any other country.

BRIEF SUMMARY

According to a first aspect of the present disclosure, there is provided a device for measurement of deviation of a surface being assessed from a reference axis including a device body having a means for determining a pre-selected reference axis, the means including: a reference surface of the device body which can be aligned with the reference axis; and an indicator on the device body for indicating alignment of the reference surface with the reference axis; a deviation meter connected to the device body to measure the extent of deviation from the reference axis, wherein the deviation meter includes: a reference point; and a gauging means indicating the measure of the deviation of the reference point from the reference surface; and further including an adjuster to adjust the relative position of the reference point of the deviation meter to the reference surface of the device.

Preferably, the adjuster is formed by the connection of the deviation meter to the device body. Preferably, the adjuster can be formed by the connection of the deviation meter to the device body such that the user holding the device body can manipulate the adjuster without handling the adjuster.

The present disclosure allows for easy and practical measurement of extent of deviation of a surface with respect to a reference axis in a single handed movement. This represents a very practical means of conducting deviation measurements in confined spaces.

Preferably, the adjuster allows adjustment of the reference point of the deviation meter to the device body while the reference surface of the device is aligning with the reference axis.

The indicator on the device body for indicating alignment of the reference surface with the reference axis can be a spirit level or the like. It can include a bubble level indicator aligned with a longitudinal axis. It further can include a bubble level indicator extending across and orthogonal to the longitudinal axis.

Preferably, the indicator on the device body for indicating alignment of the reference surface with the reference axis including a transparent vial having a liquid partially filled therein so that an air bubble is created in the transparent vial.

The device for measurement of deviation from a reference axis according to preferably has the deviation meter connected to the device body to measure the extent of deviation from the reference axis includes a deviator body movably mounted on or within a portion of the body of the device.

The adjuster connection can allow linear relative movement of the deviation body to the device body.

Alternatively, the adjuster connection can allow arcuate relative movement of the deviation body to the device body.

The deviation meter connected to the device body to measure the extent of deviation from the reference axis can includes a deviator disc movably mounted on or within a portion of the body of the device.

Preferably, the deviator disc is mounted off-center on the body of the device to allow off-center rotation of the deviator disc.

The reference point can be on the deviator disc and engages surface being assessed and locates the deviation of the reference point from the reference surface.

Preferably, the gauging means indicating the measure of the deviation of the reference point from the reference surface has a first part on the deviator disc and a second part on the body of the device.

Preferably, a distance measurement scale forms at least the first or the second part of the gauging means and calibrated so that when the deviator disc rotates off-center, the scale identifies deviation of the reference point from the reference axis.

The gauging means can indicate the measure of the deviation of the reference point from the reference surface and could include a sensor that senses the distance of the reference point from the reference surface.

Preferably, in one form the gauging means indicating the measure of the deviation of the reference point from the reference surface includes a digital display of measured deviation.

The present disclosure also provides a method for measurement of deviation from a reference axis including the steps of:

a) providing a device body having a means with an indicator on the device body for indicating alignment of a reference surface of the device body with the reference axis and providing a deviation body of a deviation meter mounted in relative movable position to the device body;

b) protruding the deviation body from the device body such that a reference point on the deviation body can engage a surface being assessed;

c) adjusting the protrusion of the deviation body and the reference point by engaging the surface being assessed;

d) reading a gauging means indicating the measure of the deviation of the reference point from the reference surface when the adjustment of the protrusion with the reference point engaging the surface being assessed is moved sufficiently that the indicator on the device body indicates alignment of the reference surface of the device body with the reference axis.

It can be seen that the disclosure of a device for measurement of deviation from a reference axis provides the benefit of the user of the device able to make assessment of surfaces alignments possibly using only one hand and allowing quick adjustment that there can be a multitude of points that need to be assessed on a single wall or in a single room. The device of the present disclosure provides a substantial advantage in that it includes a ready adjuster to adjust the relative position of the reference surface of the device to the reference point of the deviation meter.

In a related aspect of the present disclosure there is described a deviation meter to measure the extent of deviation from a select reference axis, the deviation meter adapted for connecting to a device body having a means for determining a pre-selected reference axis, wherein the deviation meter includes:

a reference point;

a gauging means indicating the measure of the deviation of the reference point from the reference surface; and an adjuster to adjust the relative position of the reference point of the deviation meter to the reference surface of the device body.

In yet a further related aspect of the present disclosure there is described a device for measurement of deviation of a surface being assessed from a reference axis including:

i. a device body having a means for determining a pre-selected reference axis, the means including:
   1. a reference surface of the device body which can be aligned with the reference axis; and
   2. an indicator on the device body for indicating alignment of the reference surface with the reference axis, wherein the indicator includes a bubble level indicator aligned with a longitudinal axis;
   3. a viewing window on an opposing surface to the reference surface disposed at an angle to the indicator for allowing the user to view the indicator from different angles to the usual viewing angle;

ii. a deviation meter connected to the device body to measure the extent of deviation from the reference axis, wherein the deviation meter includes:
   1. a reference point; and
   2. a gauging means indicating the measure of the deviation of the reference point from the reference surface;

iii. including an adjuster to adjust the relative position of the reference point of the deviation meter to the reference surface of the device wherein the adjuster is formed by the connection of the deviation meter to the device body such that the user holding the device body can manipulate the adjuster without handling the adjuster.

Preferably, the viewing window includes a reflector allowing viewing of the indicator from a first angle to a second angle.

Preferably, the viewing window is internal of the device body and located above or below the level of the indicator such that viewing through the window allows viewing of the indicator.

In one embodiment the viewing window is an internal channel to the indicator.

In still a further related aspect of the present disclosure there is described a deviation meter to measure the extent of deviation from a select reference axis. The deviation meter is adapted for connecting to a device body having a means for determining a pre-selected reference axis, wherein the deviation meter includes:

a reference point;

a gauging means indicating the measure of the deviation of the reference point from the reference surface; and an adjuster to adjust the relative position of the reference point of the deviation meter to the reference surface of the device body.

Other aspects of the invention are also disclosed.

BRIEF DESCRIPTION OF THE DRAWINGS

Notwithstanding any other forms which may fall within the scope of the present disclosure, a preferred embodiment/preferred embodiments of the disclosure will now be described, by way of example only, with reference to the accompanying drawings in which:

FIGS. 12a and 12b are diagrammatic top plan view and side view of a device for measurement of deviation from a reference axis in accordance with a further preferred embodiment of the present disclosure.

DETAILED DESCRIPTION

Figure 1:
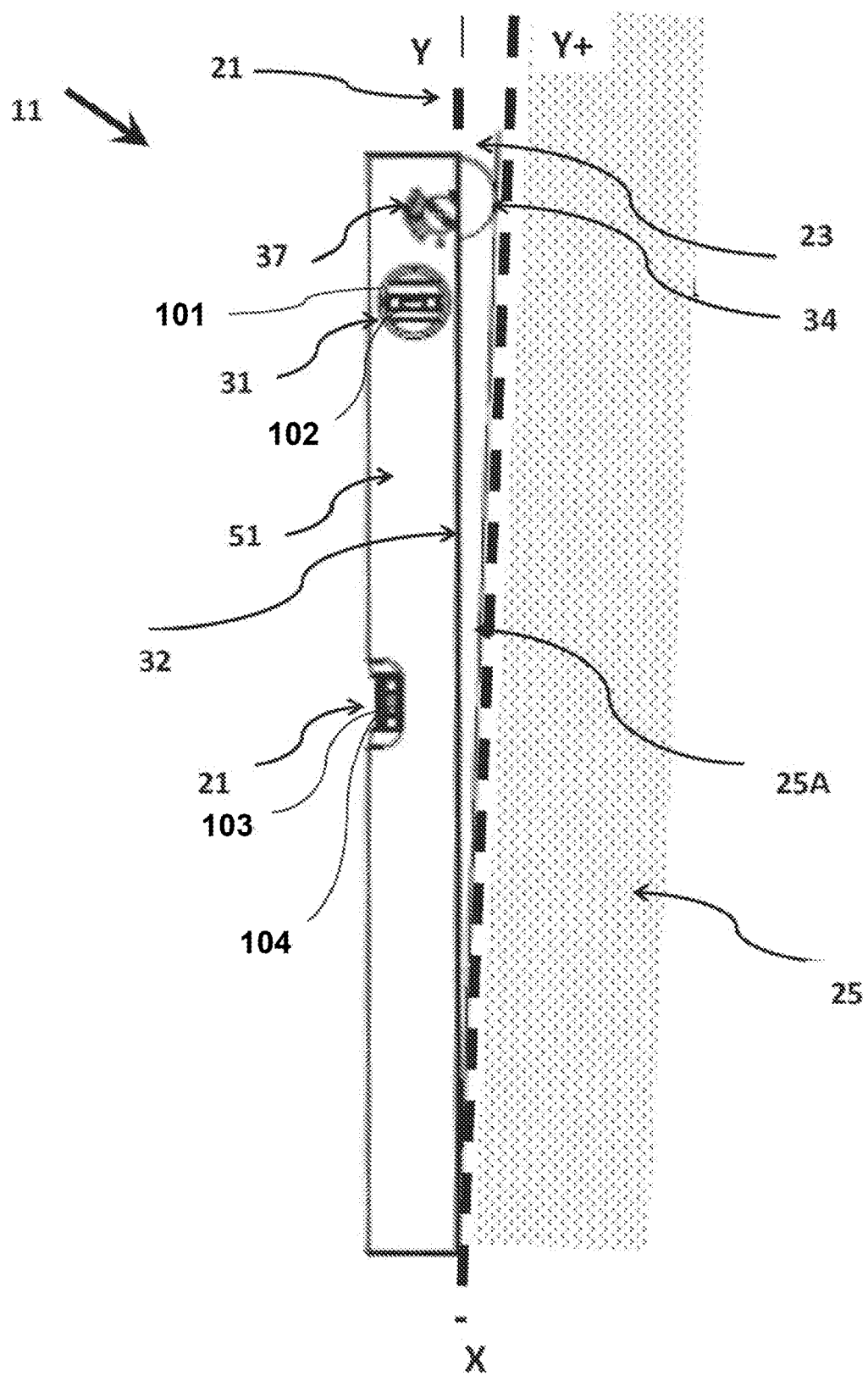
FIG. 1 is first embodiment of a device for measurement of deviation from a reference axis in accordance with a preferred embodiment of the present disclosure.

It should be noted in the following description that like or the same reference numerals in different embodiments denote the same or similar features.

Referring to the drawings and are particularly FIG. 1 there is shown a device 11 for measurement of deviation from a reference axis. The device 11 for measurement of deviation from a reference axis X-Y which forms a vertical plumb line 21.

The device 11 includes a body 51 having means of determining one of a pre-selected reference axes. In FIG. 1 there is the reference axis indicator 31 comprising a bubble leveler 101 extending across the width of the body and orthogonal to the longitudinal reference surface 32. When the bubble 102 of the bubble leveler 101 is centrally located of the bubble leveler, then the reference surface 32 of the device 11 is aligned with the reference axis X-Y which forms a vertical plumb line 21.

The device 11 includes a means of determining one of a pre-selected reference axes. In FIG. 1, there is the reference axis indicator 21 comprising a bubble leveler 103 extending along the length of the device body 51 and parallel to the longitudinal reference surface 32. When the bubble 104 of the bubble leveler 103 is centrally located, then the reference surface 32 is aligned with the reference axis X-Y.

Therefore, the device can be used to determine an alignment in the X axis and in the Z axis. Similarly, the device can be used to determine alignment in the Y axis. By relative arrangements of the reference axis indicator 31 and the reference surface 32, concordance with various reference axes can be determined.

Therefore, the device includes a reference surface which can be aligned with a preselected reference axis and an indicator for indicating alignment with that reference axis.

Figure 3:
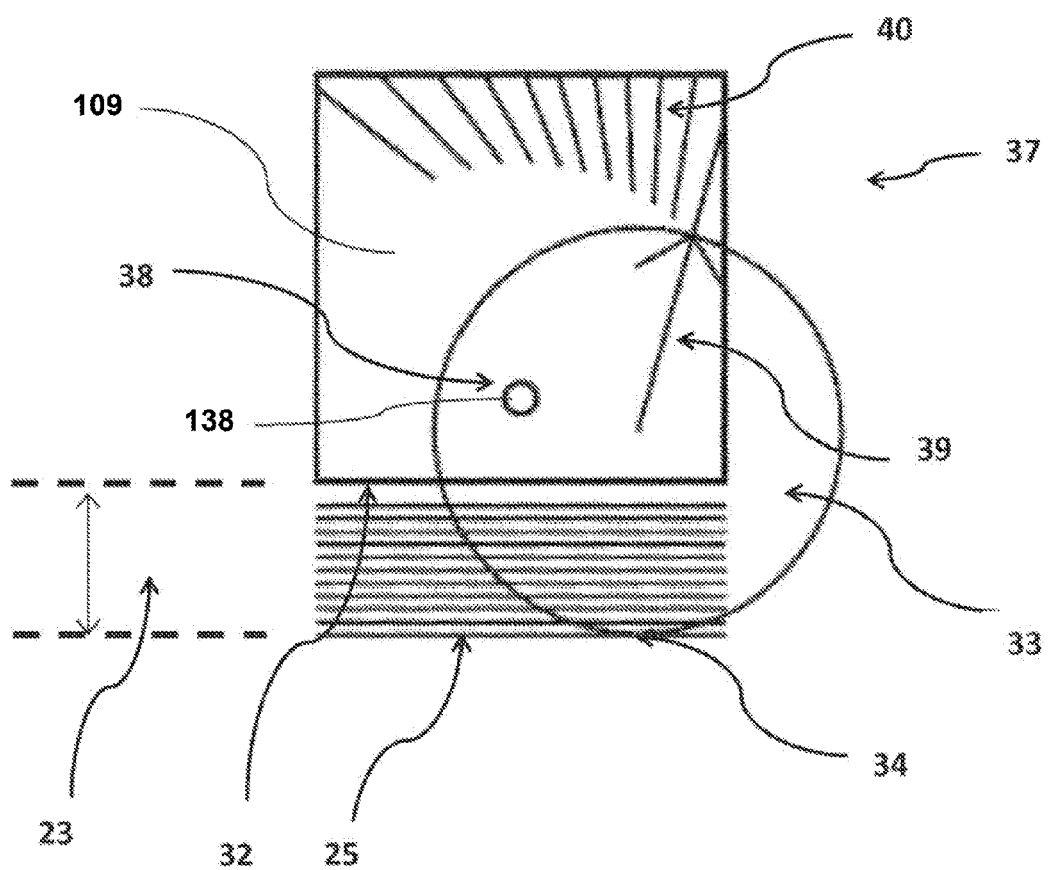
FIG. 3 is an illustrated detail of the gauging means of the device of FIG. 1B.

The device 11 further includes a deviation meter 37. In one embodiment as shown in FIG. 3, the deviation meter 37 includes a deviator 33 to measure the extent of deviation 23 of the surface 25A being measured such as a wall 25 extending from axis X to Y+, from the reference axis X to Y which in this case is the vertical plumb line 21. Therefore, the deviation 23 comprises the distance of Y to Y+ at single point along the longitudinal length of the device 11.

The deviation meter 37 (in FIG. 3) of the device 11 includes a reference point 34 and a gauging means 40 of the body 51 indicating the measure of the deviation of the reference point 34 from the reference surface 32. This therefore provides the user with an amount of deviation of the wall 25 to the vertical plumb line 21. From such measurements using the device to determine deviation is within acceptable practice or whether a false wall needs to be mounted and the deviation will provide the reference point for creating a plumb false wall or providing an indication of the padding needed to create the vertical plumb finish.

It is important though that the user of the device is able to make such measurements possibly using only one hand and allowing quick adjustment that there can be a multitude of points that need to be assessed on a single wall or in a single room. The device of the present disclosure provides a substantial advantage in that it includes a ready adjuster to adjust the relative position of the reference surface of the device to the reference point of the deviation meter.

Figure 2:
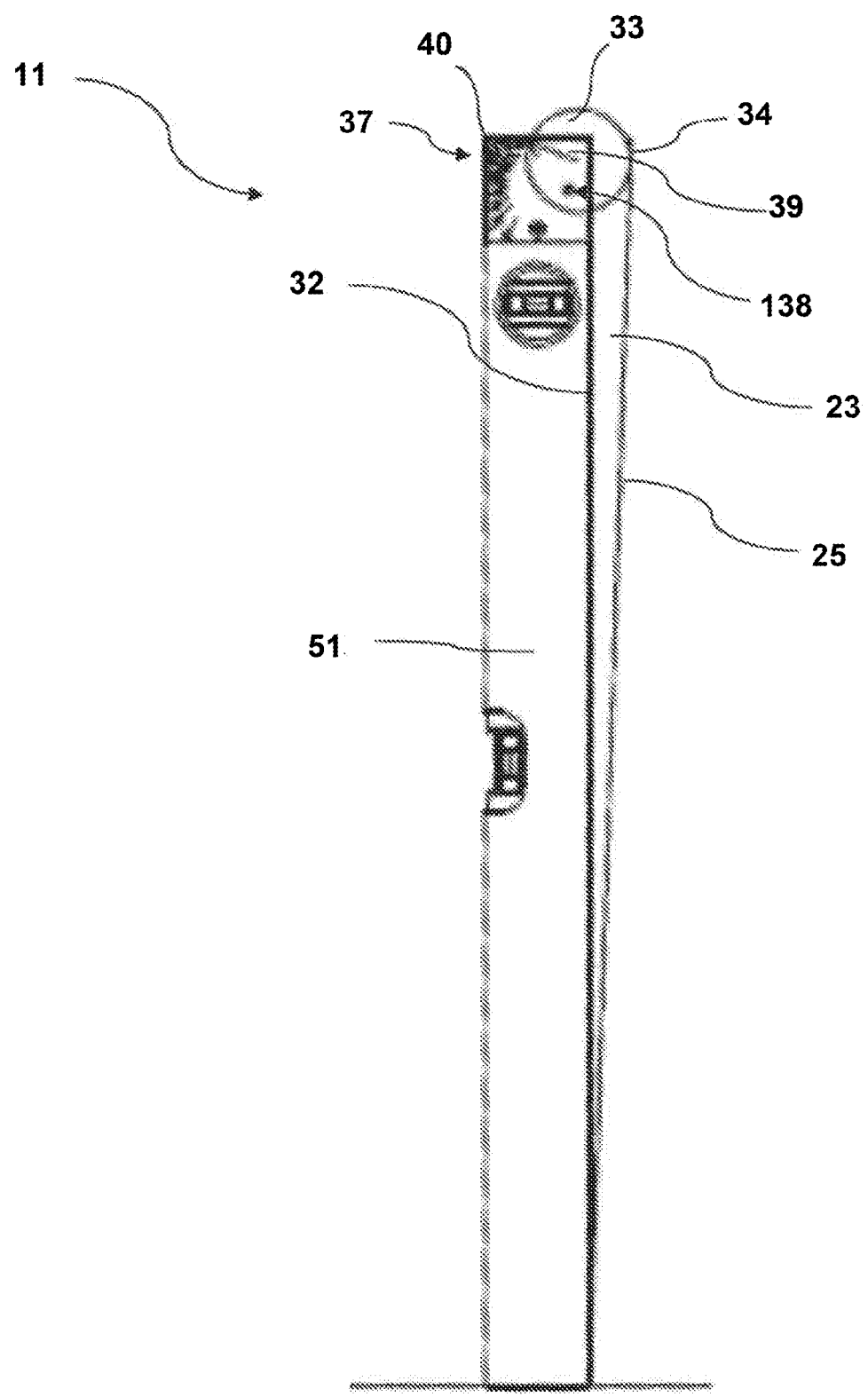
FIG. 2 is a second embodiment of a device for measurement of deviation from a reference axis in accordance with another preferred embodiment of the present disclosure.

The device 11 therefore includes an adjuster 138 to adjust the relative position of the reference point 34 of the disc 33 to the reference surface 32 of the device. In FIG. 2, the adjuster is formed by the connection of the deviation meter to the device body 51 by a pivot connection such that the user holding the device body 51 can manipulate the disc 33 of the deviator meter by the adjuster without handling the adjuster.

The reference point 34 is located on a deviator 33 which in the embodiment in FIGS. 2 and 3 is a round disk that is mounted off-center onto the body 51 of the level device 11. In one embodiment (best seen in FIG. 3), the deviator 33 can be interconnected to the body 51 by an intermediate spacer 109. This is particularly useful when retrofitting a deviation meter 37. In this case, the spacer 109 can include a gauging means in the form of a scale 40 of the spacer.

In an alternative embodiment (best seen in FIG. 10a), the body 51 of the device 11 is modified to provide an internal housing for receiving the disc 33 so that the disc is movable between a storage condition within the housing of the body and an operating condition. In FIGS. 1 and 3, the disk deviator 33 is frictionally mounted on the body 51 so that the disc is retained in relative position to the longitudinal body of the level device 11 until a moderate force is applied by the hand of the user in pressing against the wall 25. In this way the user can locate the level 11 in an approximate vertical position with the deviator disk 33 substantially extended and push against the wall so that the disk being mounted off-center will retract back towards the body of the level 11 and the reference surfaced 32 of the level will come closer to the reference axis 21 as shown by the bubble centralizing in the reference axis indicator 31.

The resulting amount of deviation 23 of the reference point 34 from the reference surface 32 when aligned with the reference axis 21 can be indicated on a gauging means 40 of the deviation meter 37. This gauging means 40 in FIGS. 1 to 3 is directly mechanically linked with the deviator 33 such that a scale of positions is indicated by an indicator 39 that is mechanically connected to the deviator 33.

Clearly though, the deviator 33 and gauging means 40 of the deviation meter could also be indirectly linked and uses such as sensors and digital indicators can provide the indication of scale opposition of the reference point 34 from the reference surface 32.

In FIG. 2, there is shown an alternative device 11 having a reference surface 32 and a deviation meter 37 for determining extent of deviation 23 of a wall 25 from plumb 21.

In this embodiment, the deviator 33 is shown in a position on the gauging means 40 indicating maximum deviation 23.

In this embodiment, the deviation meter 37 comprises a surface portion 109 of the body 51, and an offset deviator disk 33 frictionally mounted thereto. The surface portion 109 includes a scale 40, and the deviator disc 33 includes an indicator 39, wherein the extent of deviation is determined by contact between reference point 34 of the disc 33 and wall 25, and cooperation between the indicator arrow 39 and scale 40 such that indicator 39 on the offset mounted deviator disk 33 indicates the amount of deviation 23 of the reference point 34 from the reference surface 32 of the level 11 on the scale 40.

Referring to FIG. 3, there is shown a deviation meter 37 in close up view substantially corresponding to FIG. 2. The deviation meter 37 includes a surface portion 109 having a scale 40, and a deviator disc 33 mounted thereto at mounting point 38 offset from the center of the deviator disc 33. The deviator disc 33 includes an indicator 39 that interacts with the scale 40 on the surface portion 109 to indicate the amount of deviation 23 of the reference point 34 from the reference surface 32 of the device 11. This is achieved because the deviator disc 33 is mounted at point 38 offset from the center of the deviator disc 33 by an adjuster 138.

Figure 4:
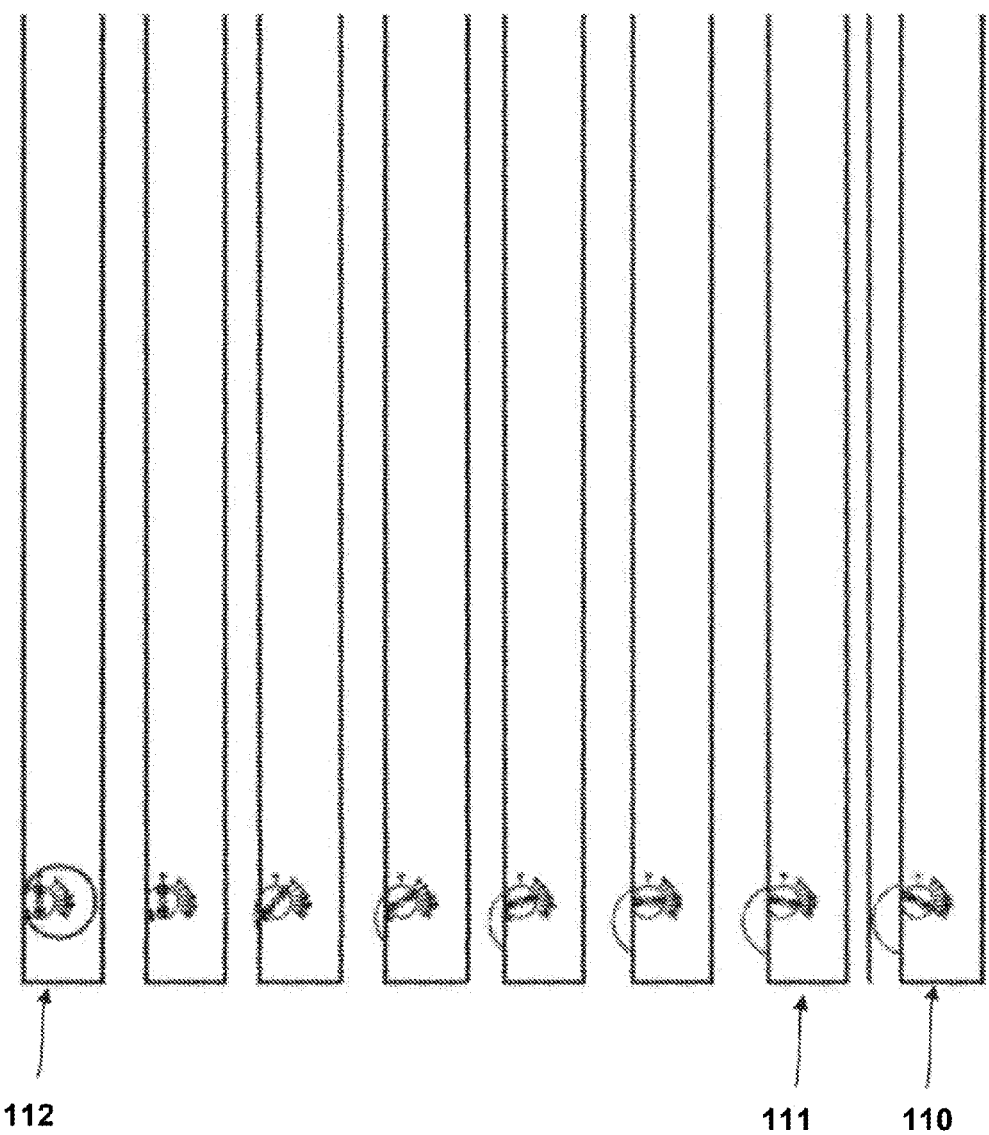
FIG. 4 is illustrated diagrammatic view of a plurality of devices at various stages of extension of the deviator in order to assist in the explanation of use.

By way of illustration, a plurality of deviations 23 are shown in FIG. 4 with the reference point 34 being shown at the greatest deviation 23 at 110. At this position the indicator arrow 39 is also at the greatest value on the scale 40 of the deviation meter 37. By the deviator disk 33 being pushed back towards the reference surface 32, the next deviation 23 will be shown by the next scale 40 at 111. Due to rotation of the disk 33 around the offset mount 38, the scale 40 magnifies the deviation 23 to allow ready determination of the actual deviation. Each one of these deviations is shown illustratively clearly in FIG. 3 where the maximum deviation 110 is shown on the right-hand side of FIG. 3 with the zero deviation 112 shown on the extreme left hand side.

Figure 5:
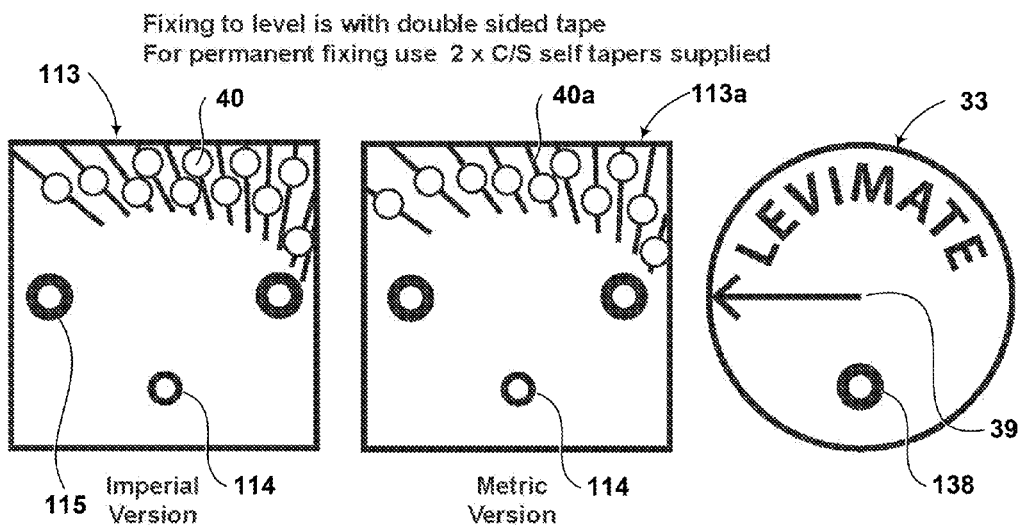
FIGS. 5 and 6 show various graduated scales of the gauging means together with a pointing indicator that can be mounted thereon.
Figure 6:
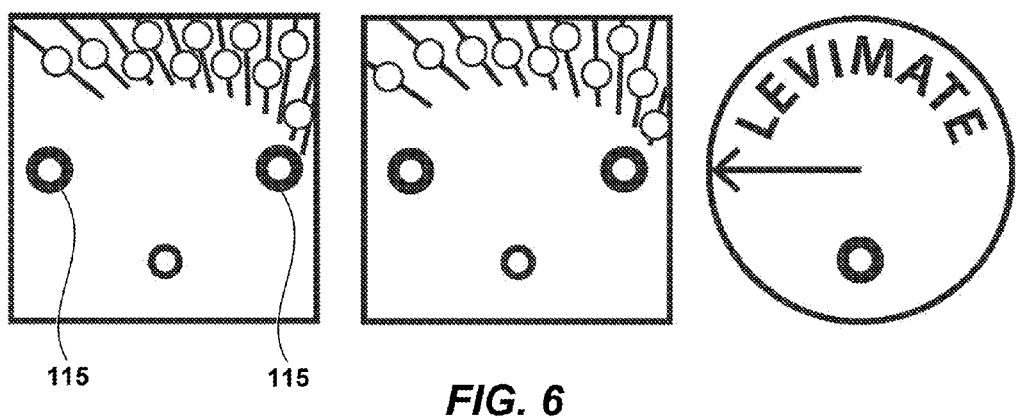

In FIGS. 5 and 6, there is shown alternative deviation meters 37 comprising a first spacing substrate 113 or 113a for mounting on a surface of the body 51, the substrates showing imperial and metric measurement scales 40a respectively. The deviation meters each include a second disc 33 including an indicator arrow 39 and a mount fixture 38 for frictional attachment to mating mount 114 by a fixing means (not shown). The fixing means in FIGS. 5 and 6 further include attachment points 115 which can comprise double sided adhesive tape or the like for attachment to a portion of the body 51.

Figure 7:
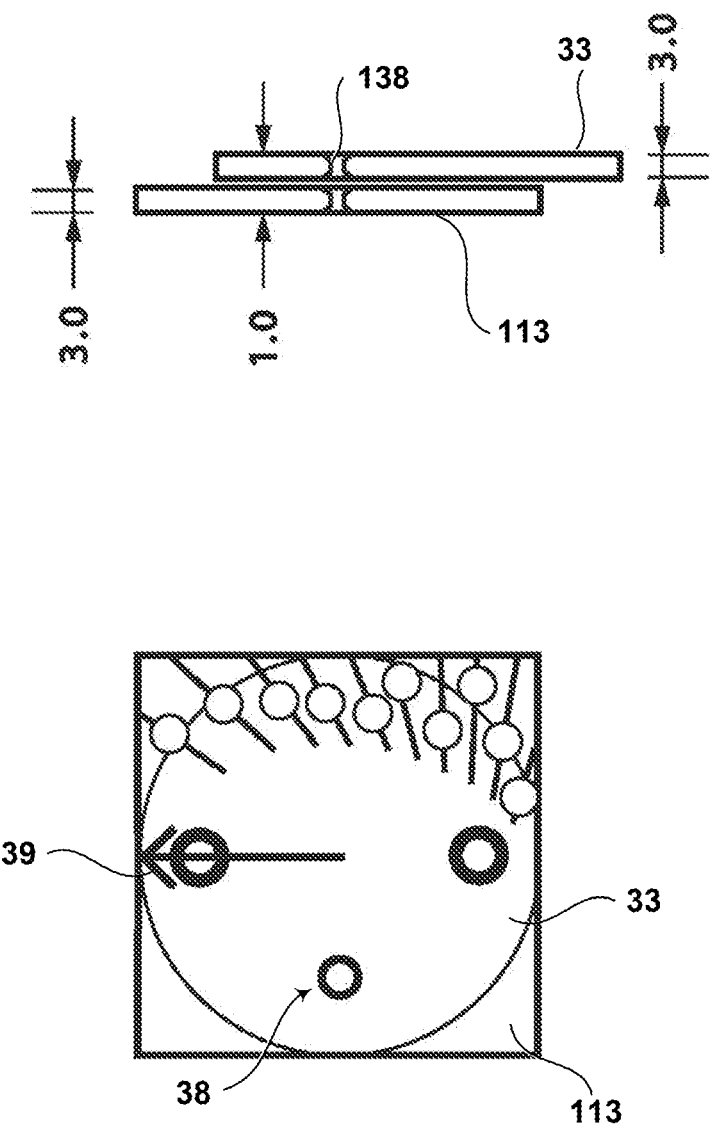
FIG. 7 is a diagrammatic side view and top view of the operation of a directly mechanically linked gauging means to the deviator.

FIG. 7 shows a deviation meter 37 according to FIGS. 5 and 6 in an assembled form. In particular, there is shown a first substrate 113 which is adapted for attachment to a body portion of a level device or the like, and a disc 33 mounted on substrate 113 at mount point 38 in movable relation. The disc 33 includes an indicator arrow 39 and a reference surface, and the substrate 113 includes a scale 40. In use, the disc 33 is movable about the mount 38 and when a reference surface of the disc 33 contacts a wall surface, the indicator arrow points to a portion of the scale 40 so that measurement of deviation 23 can be determined directly from the scale.

Figure 8:
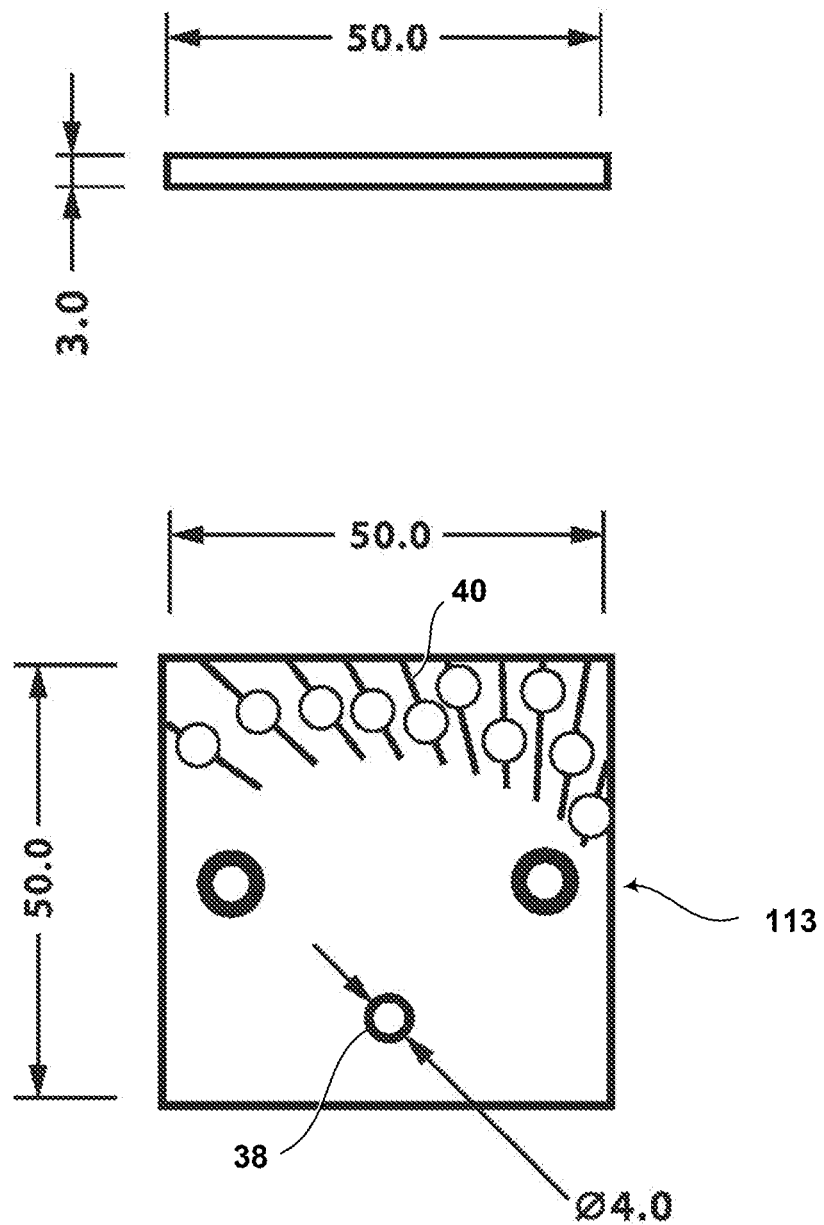
FIGS. 8 and 9 are a further diagrammatic side view and top view of the operation of a further directly mechanically linked gauging means to the deviator.

FIG. 8 shows side elevation and top plan view of the substrate 113 in FIGS. 5 to 7. In this embodiment the substrate 113 has a substantially square geometry and includes a scale 40. A mounting point 138 is shown centrally located closest to one side of the substrate. The substrate 113 also includes attachment points 115 so that the substrate can be attached fixedly or releasably on a body portion of the level device.

Figure 9:
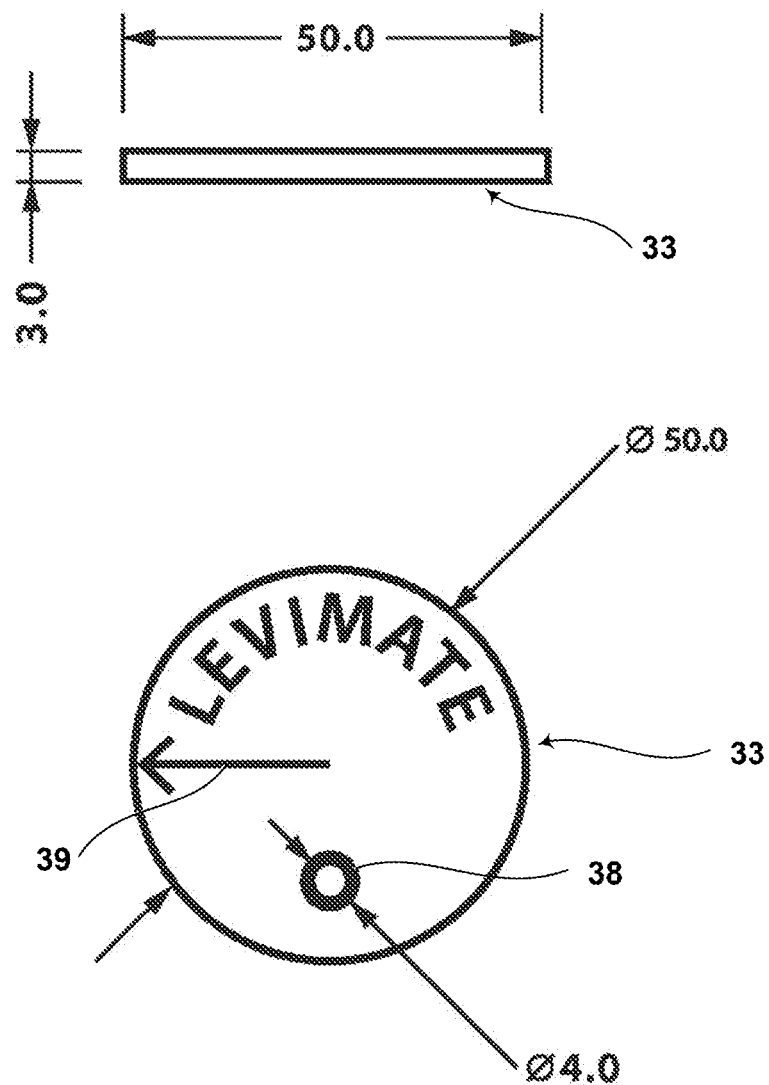

As shown in FIG. 9, the disc 33 is substantially circular and includes an indicator arrow 39 and a mount 38 which is offset from the center of the disc 33 and coincides with mount 38 of the substrate 113 so that in a mounted condition the disc 33 is movable about the offset mount position so that the indicator arrow can be coordinated with the scale 40 on the substrate to provide a measure of deviation 23.

In use, a method for measurement of deviation from a reference axis includes steps of:

a) providing a device body having a means with an indicator on the device body for indicating alignment of a reference surface of the device body with the reference axis and providing a deviation body of a deviation meter mounted in relative movable position to the device body;

b) protruding the deviation body from the device body such that a reference point on the deviation body can engage a surface being assessed;

c) adjusting the protrusion of the deviation body and the reference point by engaging the surface being assessed;

d) reading a gauging means indicating the measure of the deviation of the reference point from the reference surface when the adjustment of the protrusion with the reference point engaging the surface being assessed is moved sufficiently that the indicator on the device body indicates alignment of the reference surface of the device body with the reference axis.

Figures 10A, 10B:
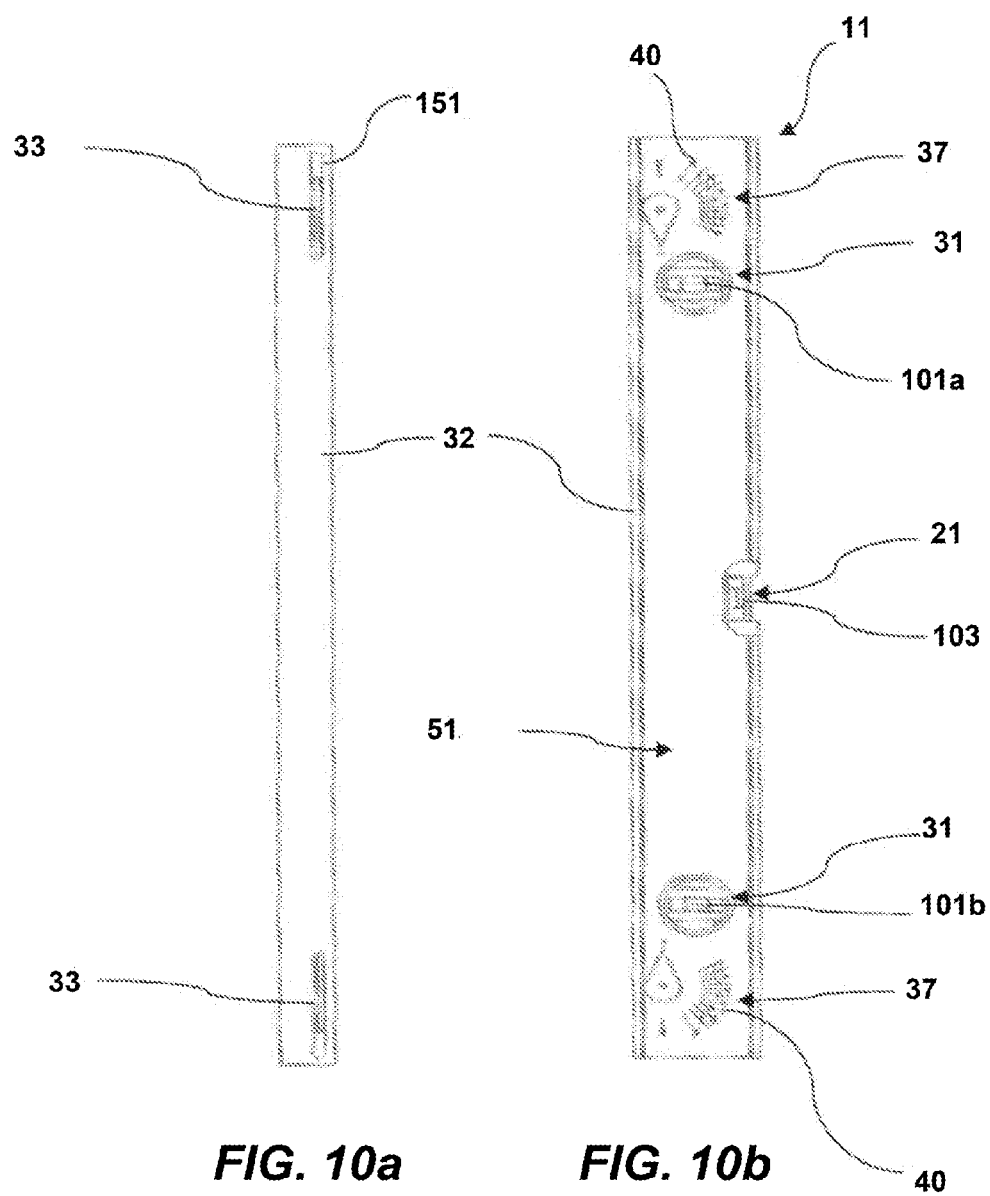
FIGS. 10a to 10d are a diagrammatic side view, top plan view, and respective end views of a device for measurement of deviation from a reference axis in accordance with a further preferred embodiment of the present disclosure.
Figures 10C, 10D:
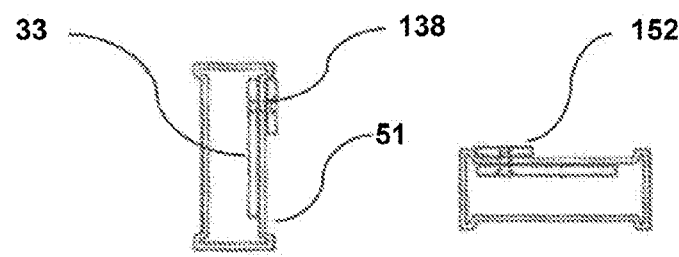

Referring to FIGS. 10a to 10d, there is shown various views of a device 11 for measurement of deviation from a reference axis. In FIG. 10a (top plan view), there is the vertical reference axis indicator 31 comprising a bubble leveler 101 extending across the width of the device and orthogonal to the longitudinal reference surface 32. When the bubble of the bubble leveler 101 is centrally located, then the reference surface 32 of the device is aligned with the vertical reference axis X-Y (refer FIG. 1). The device 11 also includes a horizontal reference axis indicator 21 comprising a bubble leveler 103 extending along the length of the device and parallel to the longitudinal reference surface 32.

The device 11 further includes a deviation meter 37 including a deviator disc 33 to measure the extent of deviation of a surface 25A (refer FIG. 1) being measured such as a wall 25 extending from axis X to Y+, from the reference axis X to Y which in this case is the vertical plumb line 21 (in FIG. 1). Therefore, the deviation 23 comprises the distance of Y to Y+ at single point along the longitudinal length of the device 11. It is understood that for determining deviation on distances larger than the device in use, the overall deviation for areas longer than the device can be calculated based on formula 1 below:

$$Lo(\text{length of object})/Ld(\text{length of device}) \times Dm(\text{deviation measurement}).$$

The deviation meter 37 includes a reference point 34 and a gauging means 40 cooperating therewith indicating the measure of the deviation of the reference point 34 from the reference surface 32. In this embodiment, the deviator disc 33 is movably received within a housing 151 of the device body 51, and the deviator meter 37 includes a teardrop-shaped indicator 152 mounted on the body and interconnected to the disc 33 by an adjustor 138 at offset mount point 38 so that the indicator 152 is movable relative to the gauging means 40 with movement of the disc 33 relative to the housing 151. As shown in FIGS. 10a and 10b, the device body includes a deviation meter at opposite ends, and in one embodiment the disc 33 can be moved between a storage condition and an operating condition.

Figure 11B:
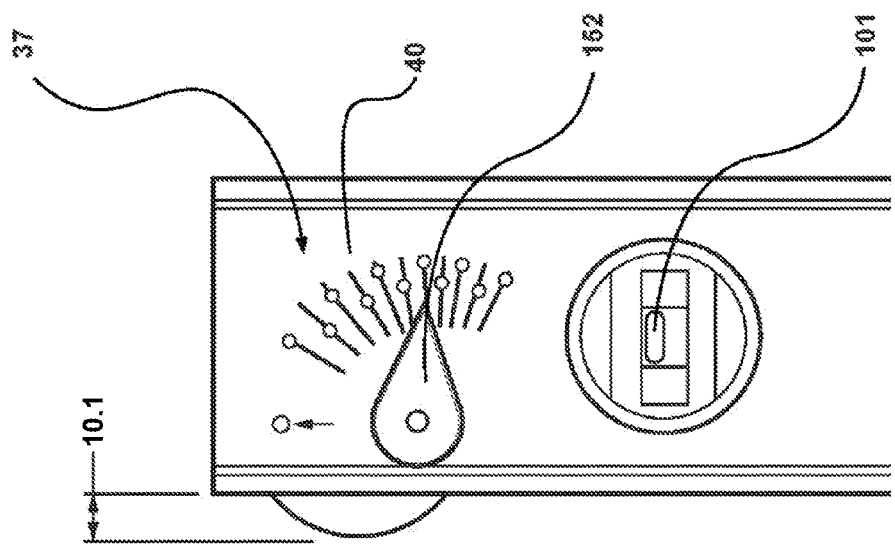
FIGS. 11a and 11b are diagrammatic top plan views of the device in FIG. 10 showing measurement determination.
Figure 11A:
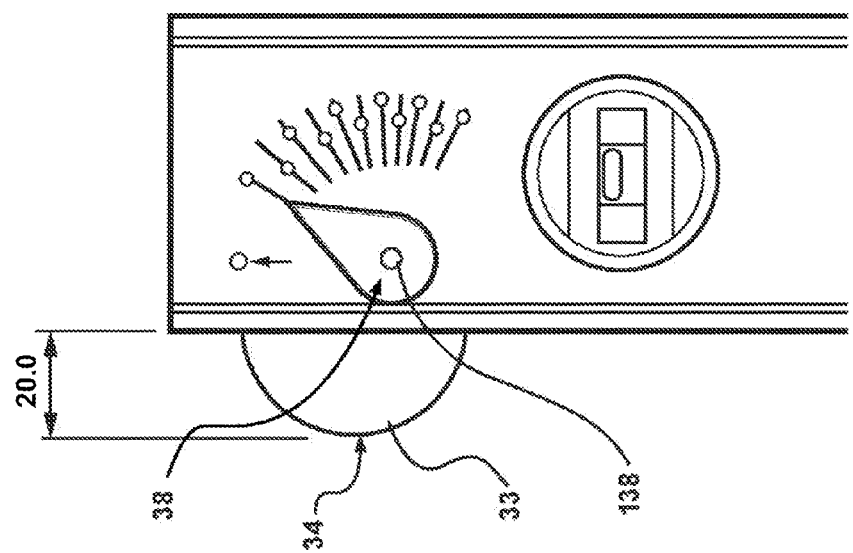

In an operating condition as shown in FIGS. 11a and 11b, the disc 33 (refer FIG. 11a) is removed from the housing 151 a first distance as indicated by indicator 152 on the scale of the gauging means 40, and thereafter a force is applied to the device body in a single movement until bubble indicator 101 and/or 101b is centered, during which period the adjuster allows movement of the indicator 152. Once the bubble is centered, the indicator 152 of the deviator meter points to deviation measurement scale on the gauging means and can be directly read.

This therefore provides the user with an amount of deviation of the wall 25 to the vertical plumb line 21. From such measurements using the device to determine deviation is within acceptable practice or whether a false wall needs to be mounted and the deviation will provide the reference point for creating a plumb false wall or providing an indication of the padding needed to create the vertical plumb finish.

In a further embodiment with reference to FIGS. 12a and 12b, there is shown a device for measurement of deviation of a surface being assessed from a reference axis including a viewing window 153 on an opposing surface to the reference surface 32 disposed at an angle to the bubble indicator 101 for allowing a user to view the indicator bubble from different angles to the usual viewing angle. The viewing window is internal of the device body 51 and located above or below the level of the indicator bubble 101 such that viewing through the window allows viewing of the indicator.

In FIG. 12a, the viewing window includes a reflector 154 allowing viewing of the indicator bubble 101 from a first angle to a second angle. In a further embodiment (not shown) the viewing window is an internal channel to the indicator.

Embodiments

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the above description of example embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Specific Details

In the description provided herein, numerous specific details are set forth. However, it is understood that embodiments of the disclosure may be practiced without these specific details. In other instances, well-known methods, structures and techniques have not been shown in detail in order not to obscure an understanding of this description.

Terminology

In describing the preferred embodiment of the disclosure illustrated in the drawings, specific terminology will be resorted to for the sake of clarity. However, the disclosure is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the disclosure, except where the context requires otherwise due to express language or necessary implication, the word "comprise" or variations such as "comprises" or "comprising" are used in an inclusive sense, i.e., to specify the presence of the stated features but not to preclude the presence or addition of further features in various embodiments of the disclosure.

Any one of the terms: including or which includes or that includes as used herein is also an open term that also means including at least the elements/features that follow the term, but not excluding others. Thus, including is synonymous with and means comprising.

Scope of Disclosure

Thus, while there has been described what are believed to be the preferred embodiments of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Although the disclosure has been described with reference to specific examples, it will be appreciated by those skilled in the art that the disclosure may be embodied in many other forms.

INDUSTRIAL APPLICABILITY

It is apparent from the above, that the arrangements described are applicable to the building and tools industries.

The claims defining the invention are as follows:

1. A device for measurement of deviation of a surface being assessed from a reference axis including:
   (i) a device body having a means for determining a pre-selected reference axis, the means including:
      1. a reference surface of the device body which can be aligned with the reference axis; and
      2. an indicator on the device body for indicating alignment of the reference surface with the reference axis;
   (ii) a deviation meter connected to the device body to measure the extent of deviation from the reference axis, wherein the deviation meter includes:
      1. a reference point; and
      2. a gauging means indicating the measure of the deviation of the reference point from the reference surface;
   (iii) including an adjuster to adjust the relative position of the reference point of the deviation meter to the reference surface of the device.

2. A device for measurement of deviation from a reference axis according to claim 1 wherein the adjuster is formed by the connection of the deviation meter to the device body such that the user holding the device body can manipulate the adjuster without handling the adjuster.

3. A device for measurement of deviation from a reference axis according to claim 1 wherein the device body is able to be held by the user and the adjuster allows adjustment of the reference point of the deviation meter to the device body while the reference surface of the device is aligning with the reference axis, and wherein the indicator on the device body for indicating alignment of the reference surface with the reference axis is a spirit level or bubble level indicator aligned with a longitudinal axis or the like.

4. A device for measurement of deviation from a reference axis according to claim 1 wherein the indicator on the device body for indicating alignment of the reference surface with the reference axis includes a bubble level indicator extending across and orthogonal to the longitudinal axis.

5. A device for measurement of deviation from a reference axis according to claim 1 wherein the indicator on the device body for indicating alignment of the reference surface with the reference axis including a transparent vial having a liquid partially filled therein so that an air bubble is created in the transparent vial.

6. A device for measurement of deviation from a reference axis according to claim 1 wherein the deviation meter connected to the device body to measure the extent of deviation from the reference axis includes a deviator body movably mounted on or within a portion of the body of the device.

7. A device for measurement of deviation from a reference axis according to claim 2 wherein the adjuster connection allows linear relative movement of the deviation body to the device body.

8. A device for measurement of deviation from a reference axis according to claim 2 wherein the adjuster connection allows arcuate relative movement of the deviation body to the device body.

9. A device for measurement of deviation from a reference axis according to claim 1 wherein the deviation meter connected to the device body to measure the extent of deviation from the reference axis includes a deviator disc movably mounted on or within a portion of the body of the device.

10. A device for measurement of deviation from a reference axis according to claim 6 wherein the deviator disc is mounted off-center on the body of the device to allow off-center rotation of the deviator disc.

11. A device for measurement of deviation from a reference axis according to claim 6 wherein the reference point is on the deviator disc and engages surface being assessed and locates the deviation of the reference point from the reference surface.

12. A device for measurement of deviation from a reference axis according to claim 6 wherein the gauging means indicating the measure of the deviation of the reference point from the reference surface has a first part on the deviator disc and a second part on the body of the device.

13. A device for measurement of deviation from a reference axis according to claim 7 wherein a distance measurement scale forming at least the first or the second part of the gauging means is calibrated so that when the deviator disc rotates off-center, the scale identifies deviation of the reference point from the reference axis.

14. A device for measurement of deviation from a reference axis according to claim 6 wherein the gauging means indicating the measure of the deviation of the reference point from the reference surface includes a sensor that senses the distance of the reference point from the reference surface.

15. A device for measurement of deviation from a reference axis according to claim 1 wherein the gauging means indicating the measure of the deviation of the reference point from the reference surface includes a digital display of measured deviation.

16. A method for measurement of deviation from a reference axis including the steps of:
   a. providing a device body having a means with an indicator on the device body for indicating alignment of a reference surface of the device body with the reference axis and providing a deviation body of a deviation meter mounted in relative movable position to the device body;
   b. protruding the deviation body from the device body such that a reference point on the deviation body can engage a surface being assessed;
   c. adjusting the protrusion of the deviation body and the reference point by engaging the surface being assessed; and
   d. reading a gauging means indicating the measure of the deviation of the reference point from the reference surface when the adjustment of the protrusion with the reference point engaging the surface being assessed is moved sufficiently that the indicator on the device body indicates alignment of the reference surface of the device body with the reference axis.

17. A device for measurement of deviation of a surface being assessed from a reference axis including:
   i. a device body having a means for determining a pre-selected reference axis, the means including:
      1. a reference surface of the device body which can be aligned with the reference axis; and
      2. an indicator on the device body for indicating alignment of the reference surface with the reference axis, wherein the indicator includes a bubble level indicator aligned with a longitudinal axis;
      3. a viewing window on an opposing surface to the reference surface disposed at an angle to the indicator for allowing the user to view the indicator from different angles to the usual viewing angle;

ii. a deviation meter connected to the device body to measure the extent of deviation from the reference axis, wherein the deviation meter includes:
1. a reference point; and
2. a gauging means indicating the measure of the deviation of the reference point from the reference surface;
iii. including an adjuster to adjust the relative position of the reference point of the deviation meter to the reference surface of the device wherein the adjuster is formed by the connection of the deviation meter to the device body such that the user holding the device body can manipulate the adjuster without handling the adjuster.

18. A device for measurement of deviation of a surface being assessed from a reference axis according to claim 17 wherein the viewing window includes a reflector allowing viewing of the indicator from a first angle to a second angle.

19. A device for measurement of deviation of a surface being assessed from a reference axis according to claim 17 wherein the viewing window extends internal of the device body and located above or below the level of the indicator such that viewing through the window allows viewing of the indicator.

20. A device for measurement of deviation of a surface being assessed from a reference axis according to claim 17 wherein the viewing window includes an internal channel to the indicator.

\* \* \* \* \*